(12) United States Patent
Ashjaee

(10) Patent No.: US 10,983,220 B2
(45) Date of Patent: Apr. 20, 2021

(54) SPOOFING DETECTION AND REJECTION

(71) Applicant: JAVAD GNSS, INC., San Jose, CA (US)

(72) Inventor: Javad Ashjaee, Saratoga, CA (US)

(73) Assignee: JAVAD GNSS, Inc., San Jose, CA (US)

( * ) Notice: Subject to any disclaimer, the term of this patent is extended or adjusted under 35 U.S.C. 154(b) by 87 days.

(21) Appl. No.: 16/195,589

(22) Filed: Nov. 19, 2018

(65) Prior Publication Data

US 2019/0154839 A1    May 23, 2019

Related U.S. Application Data

(60) Provisional application No. 62/588,828, filed on Nov. 20, 2017.

(51) Int. Cl.
| | | |
|---|---|---|
| *G01S 19/21* | (2010.01) | |
| *G01S 19/28* | (2010.01) | |
| *G01S 19/42* | (2010.01) | |

(52) U.S. Cl.
CPC ............ *G01S 19/215* (2013.01); *G01S 19/28* (2013.01); *G01S 19/42* (2013.01); *G01S 19/426* (2013.01)

(58) Field of Classification Search
CPC ........ G01S 19/215; G01S 19/21; G01S 19/28; G01S 19/42; G01S 19/30; G01S 19/32; G01S 19/36
USPC .................................................... 342/357.59
See application file for complete search history.

(56) References Cited

U.S. PATENT DOCUMENTS

| | | |
|---|---|---|
| 7,764,224 B1 | 7/2010 | Anderson |
| 7,952,519 B1 | 5/2011 | Nielsen et al. |
| 8,022,868 B2 | 9/2011 | Yudanov et al. |
| 8,094,087 B2 | 1/2012 | Ashjaee et al. |
| 8,120,527 B2 | 2/2012 | Ashjaee et al. |
| 8,125,376 B1 | 2/2012 | Ashjaee et al. |
| 8,169,379 B2 | 5/2012 | Zhukov et al. |
| 8,224,525 B1 | 7/2012 | Rapoport et al. |
| 8,606,498 B2 | 12/2013 | Pesterev et al. |
| 8,629,988 B2 | 1/2014 | Gribkov |
| 8,717,232 B2 | 5/2014 | Ashjaee et al. |
| 8,717,233 B2 | 5/2014 | Ashjaee et al. |
| 8,872,700 B2 | 10/2014 | Ashjaee et al. |
| 8,975,967 B2 | 3/2015 | Ashjaee et al. |

(Continued)

OTHER PUBLICATIONS

International Search Report and Written Opinion received for PCT Patent Application No. PCT/US2018/061835, dated Oct. 17, 2019, 14 pages.

(Continued)

*Primary Examiner* — Harry K Liu
(74) *Attorney, Agent, or Firm* — Kilpatrick Townsend & Stockton LLP

(57) ABSTRACT

Systems and methods for performing spoofing detection and rejection including receiving, at a Global Navigation Satellite System (GNSS) device having an antenna, a set of signals, identifying a questionable signal in the set of signals, and in accordance with a determination that the set of signals includes a subset of valid GNSS satellite signals, where the subset satisfies a minimum number of valid GNSS satellite signals and does not include the questionable signal, calculating an approximate position of the GNSS device based on the subset of valid GNSS satellite signals.

18 Claims, 8 Drawing Sheets

(56) References Cited

U.S. PATENT DOCUMENTS

| | | |
|---|---|---|
| 9,103,912 B2 | 8/2015 | Yudanov et al. |
| 9,168,946 B2 | 10/2015 | Ashjaee et al. |
| 9,228,835 B2 | 1/2016 | Gribkov et al. |
| 9,250,328 B2 | 2/2016 | Ashjaee et al. |
| 9,671,497 B2 | 6/2017 | Ashjaee et al. |
| 9,720,093 B2 | 8/2017 | Ashjaee |
| 9,748,926 B2 | 8/2017 | Ashjaee et al. |
| 10,024,973 B1 | 7/2018 | Alexander et al. |
| 10,466,700 B1* | 11/2019 | Carmack ................. H04L 67/12 |
| 2011/0227787 A1 | 9/2011 | Gum et al. |
| 2012/0032854 A1* | 2/2012 | Bull ..................... G01S 5/0215 |
| | | 342/450 |
| 2012/0229333 A1 | 9/2012 | Ashjaee et al. |
| 2012/0299936 A1 | 11/2012 | Ashjaee et al. |
| 2013/0016006 A1 | 1/2013 | Ashjaee et al. |
| 2014/0062778 A1 | 3/2014 | Ashjaee et al. |
| 2014/0111378 A1 | 4/2014 | Kim et al. |
| 2015/0100269 A1 | 4/2015 | Ashjaee |
| 2015/0116145 A1 | 4/2015 | Ashjaee |
| 2015/0226858 A1* | 8/2015 | Leibner ................... H04K 3/90 |
| | | 342/357.59 |
| 2015/0234055 A1 | 8/2015 | Ashjaee et al. |
| 2016/0018530 A1 | 1/2016 | Ashjaee |
| 2016/0041268 A1 | 2/2016 | Ashjaee |
| 2016/0146944 A1 | 5/2016 | Geren et al. |
| 2016/0178368 A1 | 6/2016 | Ashjaee |
| 2016/0178369 A1 | 6/2016 | Ashjaee |
| 2016/0178754 A1 | 6/2016 | Ashjaee |
| 2017/0219715 A1 | 8/2017 | Ashjaee |
| 2017/0227650 A1 | 8/2017 | Grobert |
| 2017/0293032 A1 | 10/2017 | Ashjaee |
| 2017/0343678 A1 | 11/2017 | Ashjaee |
| 2018/0045834 A1 | 2/2018 | Ashjaee |
| 2018/0062677 A1 | 3/2018 | Ashjaee |
| 2019/0011570 A1 | 1/2019 | Ashjaee |

OTHER PUBLICATIONS

International Preliminary Report on Patentability received for PCT Patent Application No. PCT/US2018/061835, dated Jun. 4, 2020, 9 pages.

* cited by examiner

SPOOFING DETECTION AND REJECTION

CROSS-REFERENCE TO RELATED APPLICATIONS

This application claims priority to U.S. Provisional Application No. 62/588,828, filed Nov. 20, 2017, entitled "SPOOF DETECTION AND REJECTION," the entire contents of which are hereby incorporated herein by reference for all purposes.

FIELD

The present disclosure relates to Global Navigation Satellite System (GNSS) devices and, more specifically, to determining accurate positioning using GNSS devices when false signals are received.

BACKGROUND

Navigation receivers that use global navigation satellite systems, such as GPS or GLONASS (hereinafter collectively referred to as "GNSS"), enable a highly accurate determination of the position of the receiver. However, the accuracy may be compromised when the position is determined based on spoofed satellite signals, which yield false locations in position and, in some cases, time.

SUMMARY

Below, various embodiments for performing spoofing detection and rejection are described. In some embodiments, a method for detecting and rejecting spoofing signals includes receiving, at a Global Navigation Satellite System (GNSS) device having an antenna, a set of signals, identifying a questionable signal in the set of signals, and in accordance with a determination that the set of signals includes a subset of valid GNSS satellite signals, where the subset satisfies a minimum number of valid GNSS satellite signals and does not include the questionable signal, calculating an approximate position of the GNSS device based on the subset of valid GNSS satellite signals.

Various examples of the present embodiments are contemplated. In some examples, the method includes determining, based on the approximate position, whether the questionable signal is validated, and calculating a precise position of the GNSS device based on the validated signal. In some examples, the minimum number of valid GNSS satellite signals is four valid GNSS satellite signals. In some examples, the method includes, in accordance with a determination that the set of signals does not include the subset of valid GNSS satellite signals: issuing a warning that spoofing signals are detected, and providing guidance for navigating out of a spoofed area where the spoofing is detected.

In some examples, identifying the questionable signal includes identifying a signal having more than one peak; identifying, based on almanac data, a signal that should not be received by the GNSS device; identifying a signal having a signal-to-noise ratio (SNR) that exceeds a maximum SNR or is inconsistent with other detected SNRs; identifying a signal in a plurality of signals having similar SNRs, where the plurality of signals are associated with different pseudorandom noise (PRN) codes; identifying a signal associated with a satellite that does not generate complete multi-frequency signals; identifying a signal that is a C/A code signal; and/or identifying a signal having a signal power that exceeds a maximum signal power or a threshold background noise level.

In some examples, the method includes determining a direction of a source of the questionable signal by detecting a direction in which GNSS satellite signal energy reaches a minimum level. In some examples, where the set of signals is received at the GNSS device via the antenna while the antenna is at a first orientation, the method includes receiving a second set of signals at the GNSS device via the antenna while the antenna is at a second orientation different from the first orientation, and determining the direction of the source of the questionable signal based on the set of signals and the second set of signals.

Further, in some examples, the GNSS device includes a plurality of channels for receiving a plurality of signals from a plurality of satellites, and the method includes, for each satellite of the plurality of satellites, assigning multiple channels from the plurality of channels to the satellite using a PRN code associated with the satellite, and receiving, at the plurality of channels, the set of signals, where each signal of the set of signals includes the PRN code associated with its source satellite. In some examples, the subset of valid GNSS signals includes signals received from at least one of a GPS, Galileo, GLONASS, BeiDou, QZSS, SBAS, and IRNSS navigation systems. In some examples, the method includes receiving, at a user input device associated with the GNSS device, a manually-entered approximate position, and based on the manually-entered approximate position, determining whether the set of signals includes a spoofing signal.

In some embodiments, a computer readable storage medium stores one or more programs. The one or more programs include instructions, which when executed by a GNSS device having an antenna, cause the device to perform any of the methods described herein.

In some embodiments, a GNSS device includes an antenna, one or more processors, memory, and one or more programs, where the one or more programs are stored in the memory and configured to be executed by the one or more processors, the one or more programs including instructions for performing any of the methods described herein.

In some embodiments, a GNSS device includes means for performing any of the methods described herein.

In some embodiments, systems and methods include receiving, at a Global Navigation Satellite System (GNSS) device having an antenna, a set of signals, determining whether the set of signals includes a questionable signal, the determination being based on one or more of the following attributes: (a) the signal contains more than one correlation peak, (b) the signal should not be received based on almanac data, (c) the signal exceeds a predetermined signal-to-noise ratio, (d) the signal exceeds a predetermined signal power, or (e) the signal exceeds a predetermined noise level, and in accordance with a determination that the set of signals includes a questionable signal, outputting, at the GNSS device, an indication that the questionable signal has been received.

BRIEF DESCRIPTION OF THE DRAWINGS

The present application can be best understood by reference to the figures described below taken in conjunction with the accompanying drawing figures, in which like parts may be referred to by like numerals.

FIG. 3A illustrates an example user interface showing that no spoofing signals were detected at a GNSS device, in accordance with various embodiments of the present invention.

FIG. 3B illustrates an example user interface indicating that spoofing signals were detected at a GNSS device, in accordance with various embodiments of the present invention.

DETAILED DESCRIPTION

Figure 1:
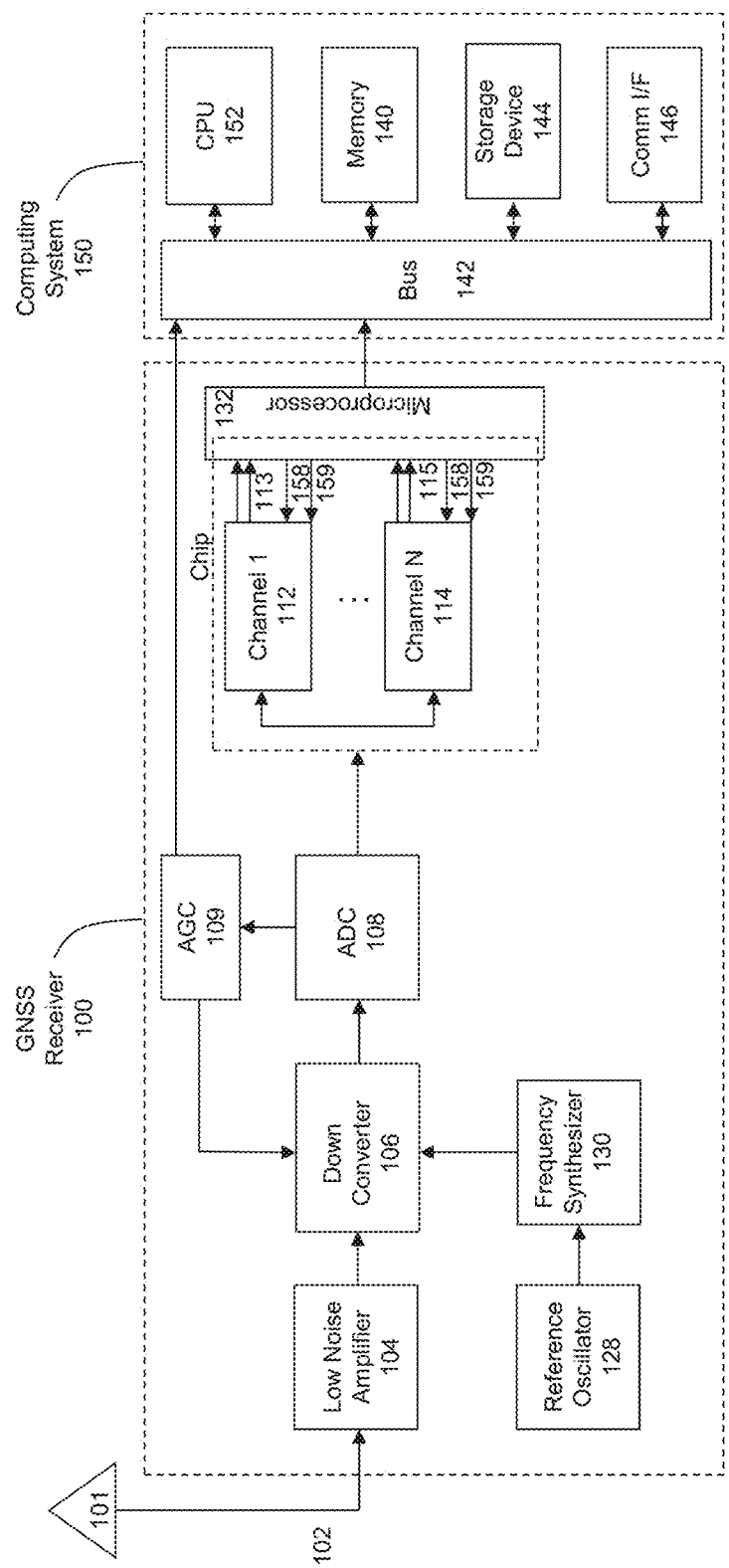
FIG. 1 illustrates an example GNSS antenna, receiver, and computing system that may be used to implement various embodiments of the present invention.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the technology as claimed. Thus, the various embodiments are not intended to be limited to the examples described herein and shown, but are to be accorded the scope consistent with the claims.

Global navigation satellite system ("GNSS") devices can be misled into providing incorrect location or time solutions when false, GNSS-like "spoofing" signals (also referred to herein as "spoofed" signals or "spoofer" signals) are received. For instance, when spoofing signals are received at a GNSS device that is unaware that false signals were received, the device may proceed to use the false signals in calculating its position and time. However, position and time derived from false signals are inaccurate and often incorrect.

The present disclosure is intended to address such issues and provide related advantages. Specifically, the present disclosure provides systems and methods for performing spoofing detection and rejection. In some examples, systems and methods described herein detect a spoofing signal and issue an alarm or other warning alerting that the spoofing signal exists. In some examples, systems and methods described herein determine a direction that spoofing signals originate from.

Merely by way of example, spoofer systems that broadcast incorrect signals (hereinafter also referred to as "spoofers") use three common methods. In one method, spoofers broadcast false GNSS-like signals that provide wrong ranging information, which when used by GNSS devices, create wrong position and time solutions. In some cases, this spoofing method fools the GNSS device into ignoring the correlation peak of the real satellite signal and using the correlation peak of the spoofer signal. As discussed further below, the systems and methods for spoofing detection and rejection described herein defend attacks of this method. For example, systems and methods described herein assign more than one channel to each satellite signal to receive and track the peaks of each satellite signal, such as its real peak and any spoofer peak, and exclude signals having more than one correlation peak from position and time calculations.

In another spoofing method, spoofers broadcast incorrect signals for satellites that are below the horizon in the spoofed area or for satellites that do not exist. Such signals, in this case, may have only one correlation peak, which may be the spoofer peak. As discussed further below, the systems and methods for spoofing detection and rejection described herein defend attacks of this method. For instance, the GNSS device employing spoofing detection and rejection downloads valid and certified almanac data from known sources (e.g., known websites) to obtain the status of satellites and their visibility ahead of a mission. Such almanac data can be used for several weeks and updated at the GNSS device as needed. The GNSS device can identify signals that should not be received according to the almanac data, and exclude such signals from position and time calculations.

In yet another method, spoofers cover actual satellite signals of a visible satellite with noise, and in some cases add the false signal on top of the noise and actual satellite signal with more power. As discussed further below, the systems and methods for spoofing detection and rejection described herein defend attacks of this method by recognizing and/or flagging signals that have unreasonable signal power and/or background noise. Such flagged signals are excluded from position and time calculations, and/or subsequently verified as true or false signals based on a known position and time prior to using any verified valid signals in determining a precise position and time.

Turning now to FIG. 1, FIG. 1 illustrates an example Global Navigation Satellite System ("GNSS") receiver 100 that may be used within a GNSS device to perform spoofing detection and rejection according to various embodiments and examples described herein. GNSS receiver 100 may receive GNSS signals 102, such as GPS or GLONASS signals, via a GNSS antenna 101. GNSS signal 102 may contain two pseudo-noise ("PN") code components, a coarse code, and a precision code residing on orthogonal carrier components, which may be used by GNSS receiver 100 to determine the position of the GNSS receiver. For example, a typical GNSS signal 102 may include a carrier signal modulated by two PN code components. The frequency of the carrier signal may be satellite specific. Thus, each GNSS satellite may transmit a GNSS signal at a different frequency.

GNSS receiver 100 may further include a low noise amplifier 104, a reference oscillator 128, a frequency synthesizer 130, a down converter 106, an automatic gain control (AGC) 109, and an analog-to-digital converter (ADC) 108. These components may perform amplification, filtering, frequency down-conversion, and sampling. The reference oscillator 128 and frequency synthesizer 130 may generate a frequency signal to down convert the GNSS signals 102 to baseband or to an intermediate frequency that depends on the entire receiver frequency plan design and available electronic components. The ADC 108 may then convert the GNSS signals 102 to a digital signal by sampling multiple repetitions of the GNSS signals 102.

GNSS receiver 100 may further include multiple GNSS channels, such as channels 112 and 114. It should be understood that any number of channels may be provided to receive and demodulate GNSS signals 102 from any number of satellites. The GNSS channels 112 and 114 may each contain a demodulator to demodulate a GNSS PN code contained in ADC signal 109, a PN code reference generator, a numerically controlled oscillator (code NCO) to drive the PN code generator as well as a carrier frequency demodulator (e.g., a phase detector of a phase locked loop—PLL), and a numerically controlled oscillator to form a reference carrier frequency and phase (carrier NCO). In one example, the numerically controlled oscillator (code NCO) of channels 112 and 114 may receive code frequency/phase control signal 158 as input. Further, the numerically controlled oscillator (carrier NCO) of channels 112 and 114 may receive carrier frequency/phase control signal 159 as input.

In one example, the processing circuitry for the GNSS channels may reside in an application specific integrated circuit ("ASIC") chip 110. When a corresponding frequency is detected, the appropriate GNSS channel may use the embedded PN code to determine the distance of the receiver from the satellite. This information may be provided by GNSS channels 112 and 114 through channel output vectors 113 and 115, respectively. Channel output vectors 113 and 115 may each contain four signals forming two vectors—inphase I and quadriphase Q which are averaged signals of the phase loop discriminator (demodulator) output, and inphase dI and quadriphase dQ—averaged signals of the code loop discriminator (demodulator) output.

In some examples, computing system 150 may be coupled to receive position information (e.g., in the form of channel output vectors 113 and 115 or any other representation of position) from GNSS receiver 100. Computing system 150 may include processor-executable instructions for performing spoofing detection and rejection (e.g., for performing process 600 of FIG. 6), stored in memory 140. The instructions may be executable by one or more processors, such as a CPU 152. However, those skilled in the relevant art will also recognize how to implement the current technology using other computer systems or architectures. CPU 152 may be implemented using a general or special purpose processing engine such as, for example, a microprocessor, microcontroller or other control logic. In this example, CPU 152 is connected to a bus 142 or other communication medium.

Memory 140 may include read only memory ("ROM") or other static storage device coupled to bus 142 for storing static information and instructions for CPU 152. Memory 140 may also include random access memory (RAM) or other dynamic memory, for storing information and instructions to be executed by CPU 152. Memory 140 may also be used for storing temporary variables or other intermediate information during execution of instructions to be executed by CPU 152.

Computing system 150 may further include an information storage device 144 coupled to bus 142. The information storage device may include, for example, a media drive (not shown) and a removable storage interface (not shown). The media drive may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media may include, for example, a hard disk, floppy disk, magnetic tape, optical disk, CD or DVD, or other fixed or removable medium that is read by and written to by media drive. As these examples illustrate, the storage media may include a non-transitory computer-readable storage medium having stored therein particular computer software or data.

In other examples, information storage device 144 may include other similar instrumentalities for allowing computer programs or other instructions or data to be loaded into computing system 150. Such instrumentalities may include, for example, a removable storage unit (not shown) and an interface (not shown), such as a program cartridge and cartridge interface, a removable memory (e.g., a flash memory or other removable memory module) and memory slot, and other removable storage units and interfaces that allow software and data to be transferred from the removable storage unit to computing system 150.

Computing system 150 may further include a communications interface 146. Communications interface 146 may be used to allow software and data to be transferred between computing system 150 and external devices. Examples of communications interface 146 may include a modem, a network interface (such as an Ethernet or other NIC card), a communications port (such as for example, a USB port), a PCMCIA slot and card, etc. Software and data transferred via communications interface 146. Some examples of a communication interface 146 include a phone line, a cellular phone link, an RF link, a network interface, a local or wide area network, and other communications channels.

In some examples, GNSS antenna 101, GNSS receiver 100, and computing system 150 may be included within a handheld GNSS device similar or identical to that described in U.S. patent application Ser. No. 12/871,705, filed Aug. 30, 2010, issued as U.S. Pat. No. 8,125,376, and assigned to the assignee of the present application, which is incorporated herein by reference in its entirety for all purposes. For example, the handheld GNSS device may include a display, orientation sensors, distance sensors, a camera, a compass, and the like, coupled to GNSS receiver 100 and/or computing system 150. In some examples, the GNSS device includes other sensors or detectors, such as an altimeter, compass, and/or gyroscope (not shown).

Figure 2:
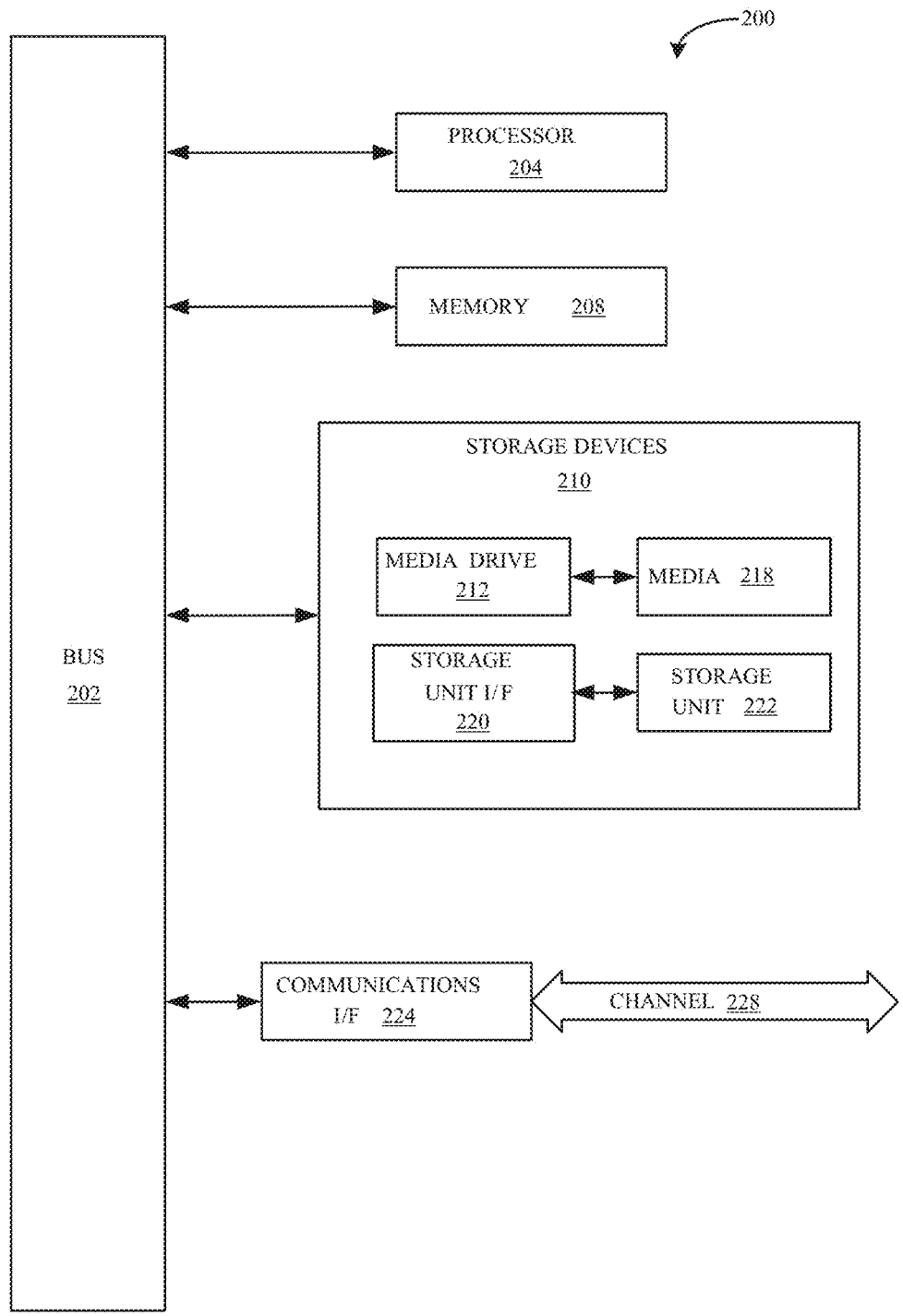
FIG. 2 illustrates another example computing system that may be used to implement various embodiments of the present invention.

FIG. 2 illustrates another example computing system 200 that may be employed to implement processing functionality for various aspects of the current technology (e.g., as a GNSS device, GNSS receiver 100, microprocessor 132, computing system 150, CPU 152, activity data logic/database, combinations thereof, and the like). In some examples, computing system 200 may be the same or similar as computing system 150 in FIG. 1, and may be used additionally and/or alternatively with example components of the GNSS device in FIG. 1. Those skilled in the relevant art will also recognize how to implement the current technology using other computer systems or architectures. Computing system 200 may represent, for example, a user device such as a desktop, mobile phone, geodesic device, and so on as may be desirable or appropriate for a given application or environment. Computing system 200 can include one or more processors, such as a processor 204. Processor 204 can be implemented using a general or special purpose processing engine such as, for example, a microprocessor, microcontroller or other control logic. In this example, processor 204 is connected to a bus 202 or other communication medium.

Computing system 200 can also include a main memory 208, such as random access memory (RAM) or other dynamic memory, for storing information and instructions to be executed by processor 204. Main memory 208 also may be used for storing temporary variables or other intermediate information during execution of instructions to be executed by processor 204. Computing system 200 may likewise include a read only memory ("ROM") or other static storage device coupled to bus 202 for storing static information and instructions for processor 204.

The computing system 200 may also include information storage mechanism 210, which may include, for example, a media drive 212 and a removable storage interface 220. The media drive 212 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 218 may include, for example, a hard disk, floppy disk, magnetic tape, optical disk, CD or DVD, or other fixed or removable medium that is read by and written to by media drive 214. As these examples illustrate, the storage media 218 may include a computer-readable storage medium having stored therein particular computer software or data.

In alternative embodiments, information storage mechanism 210 may include other similar instrumentalities for allowing computer programs or other instructions or data to be loaded into computing system 200. Such instrumentalities may include, for example, a removable storage unit 222 and an interface 220, such as a program cartridge and cartridge interface, a removable memory (for example, a flash memory or other removable memory module) and memory slot, and other removable storage units 222 and interfaces 220 that allow software and data to be transferred from the removable storage unit 218 to computing system 200.

Computing system 200 can also include a communications interface 224. Communications interface 224 can be used to allow software and data to be transferred between computing system 200 and external devices. Examples of communications interface 224 can include a modem, a network interface (such as an Ethernet or other NIC card), a communications port (such as for example, a USB port), a PCMCIA slot and card, etc. Software and data transferred via communications interface 224 are in the form of signals which can be electronic, electromagnetic, optical, or other signals capable of being received by communications interface 224. These signals are provided to communications interface 224 via a channel 228. This channel 228 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable storage medium" may be used generally to refer to media such as, for example, memory 208, storage device 218, or storage unit 222. These and other forms of computer-readable media may be involved in providing one or more sequences of one or more instructions to processor 204 for execution. Such instructions, generally referred to as "computer program code" (which may be grouped in the form of computer programs or other groupings), when executed, enable the computing system 200 to perform features or functions of embodiments of the current technology.

In an embodiment where the elements are implemented using software, the software may be stored in a computer-readable medium and loaded into computing system 200 using, for example, removable storage drive 214, drive 212 or communications interface 224. The control logic (in this example, software instructions or computer program code), when executed by the processor 204, causes the processor 204 to perform the functions of the technology as described herein.

Turning now to FIGS. 3A-3E, examples of various user interfaces provided by the GNSS device that employs spoofing detection and rejection are illustrated. Such user interfaces may be provided at a display (e.g., a touchscreen) at the GNSS device and/or at an external display in operative communication with the GNSS device. As described below, in some examples, user interfaces provided by the GNSS device display information related to the satellite signals being received and indicate, in real-time and/or near-real-time, to the user when a spoofing signal is detected. A benefit of indicating to the user when spoofers are detected is that the GNSS device can inform the user of potentially false location and time solutions, warn the user regarding a change in the mode of operation of the device (e.g., changing from satellite-based navigation to other sensor-typed based navigation), prompt further user input for an altered mode of operation at the device (e.g., determining a direction or source of a spoofer), and/or guide the user to use other sensors, such as a compass and altimeter, for navigation (e.g., for navigating out of the spoofed area).

Figures 3A, 3B:
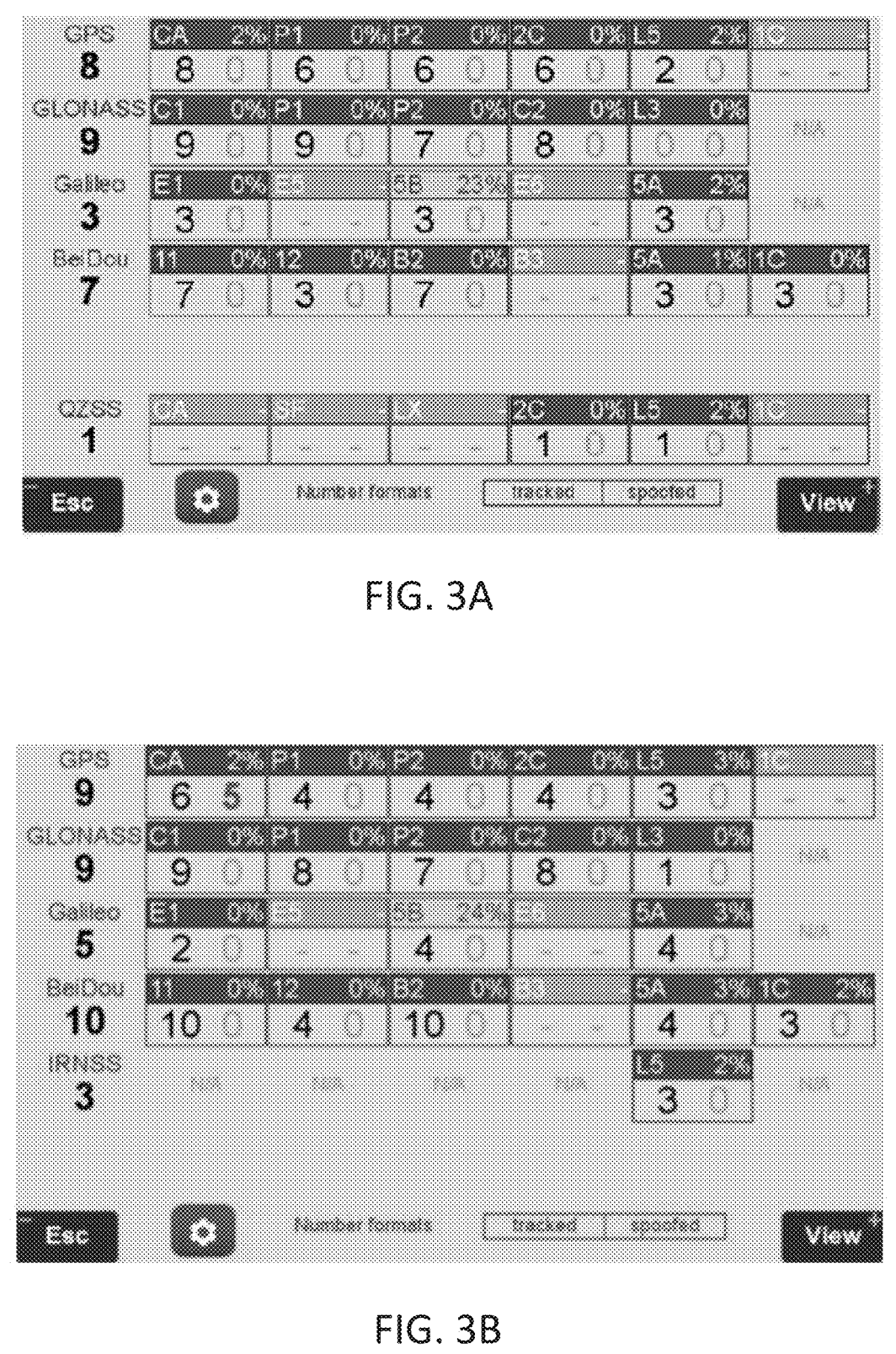
Figure 3C:
FIG. 3C illustrates another example user interface indicating that spoofing signals were detected at a GNSS device, in accordance with various embodiments of the present invention.

The example user interfaces at FIGS. 3A-3C provide tables displaying information on satellite signals that are received and measured at the GNSS device. FIG. 3A illustrates an example user interface showing that no spoofing signals are received or otherwise detected at the GNSS device. Specifically, the user interface at FIG. 3A shows signals received from five navigation systems: GPS, GLONASS, Galileo, BeiDou, and QZSS. The user interface further shows almanac data for the satellites. For example, according to the almanac data, 8 GPS satellites, 9 GLONASS satellites, 3 Galileo satellites, 7 BeiDou satellites, and 1 QZSS satellite were visible (or should be visible) at the time. Further, the user interface table shows satellite signals that are received and tracked by the GNSS device. For example, the first row in the user interface shows that from the GPS satellites, 8 C/A signals were tracked while the noise level was 2% in the C/A band (e.g., frequency band), 6 P1 signals were tracked while the noise level was 0% in the P1 band, 6 P2 signals were tracked while the noise level was 0% in the P2 band, 6 2C signals were tracked while the noise level was 0% in the 2C band, and 2 L5 signals were tracked while the noise level was 2% in the L5 band.

It can be understood that other entries in the user interface at FIG. 3A can be interpreted in similar fashion. Merely by way of further example, the user interface at FIG. 3A indicates that for the Galileo satellites, 3 E1 signals were tracked while the noise level was 0% in the E1 band, 3 5B signals were tracked while the noise level was 23% in the 5B band, and 3 5A signals were tracked while the noise level was 2% in the 5A band. The user interface may indicate, flag, alarm, or otherwise warn when a high noise level is detected, such as when a detected noise level for signal(s) exceeds a maximum noise level. For example, at FIG. 3A, the user interface highlights that 3 Galileo 5B signals were tracked while a high 23% noise level was detected in the 5B band.

Unlike FIG. 3A described above, FIGS. 3B-3C illustrate example user interfaces indicating, warning, or otherwise alarming that spoofing signals are received or otherwise detected at the GNSS device. For example, at FIG. 3B, the user interface indicates that 9 GPS satellites were visible according to the almanac data, and 6 GPS C/A signals were tracked while the noise level was 2% in the C/A band, but that 5 of those 6 GPS C/A signals were spoofed signals. Such spoofed signals are detected in accordance with the methods described herein, for example in process 600 at FIG. 6 below. The number of spoofed signals received in each band can be indicated by a different display format, such as a different colored font (e.g., red bold font, compared to black regular font for other information). In FIG. 3B, a Number Formats legend is displayed showing formats for tracked versus spoofed display formats. It is further noted that the user interface at FIG. 3B highlights that a high noise level of 24% was detected in the 5B Galileo band when 4 5B Galileo signals were received.

FIG. 3C shows another example of a user interface indicating that spoofing signals have been received at the GNSS device. For example, at FIG. 3C, the user interface indicates that 10 GPS satellites were visible according to the almanac data, and 9 GPS C/A signals were tracked while the noise level was 0% in the C/A band, but that 6 of those 9 GPS C/A signals were spoofed signals. Here, the number of spoofed signals (e.g., "6") is indicated by a different display format (e.g., red bold font) than the number of signals received (e.g., "9", shown in black regular font).

Figure 3D:
FIG. 3D illustrates an example user interface providing details of tracked satellite signals, including spoofing signals, in accordance with various embodiments of the present invention.

Turning to FIG. 3D, another example user interface providing further details of tracked satellite signals are illustrated. For instance, the user interface at FIG. 3D provides a chart showing details of various GPS satellite signals. Specifically, the first six lines of the chart show details for the 6 spoofed GPS C/A signals (e.g., signals from satellites GPS3, GPS6, GPS9, GPS16, GPS22, GPS23), where each spoofed signal is indicated with an inline entry of "1" at column C1. The chart further shows the characteristics of each peak for the 6 spoofed GPS C/A signals (e.g., at the two section columns with "SS", "MIN", "C1", "SS", "MAX", "C1"), and the second SS column shows if the second peak of the 6 spoofed signals is a consistent signal. As illustrated in FIG. 3D, while 6 GPS satellites were spoofed (e.g., GPS3, GPS6, GPS9, GPS16, GPS22, GPS23), there was no indication on the noise level (e.g., showing "0%" inline for each of the spoofed signals) and no indication on the spectrum shape and level (e.g., showing "11.0" inline each of the spoofed signals) that the signals tracked from those spoofed satellites are spoofing signals.

Figure 3E:
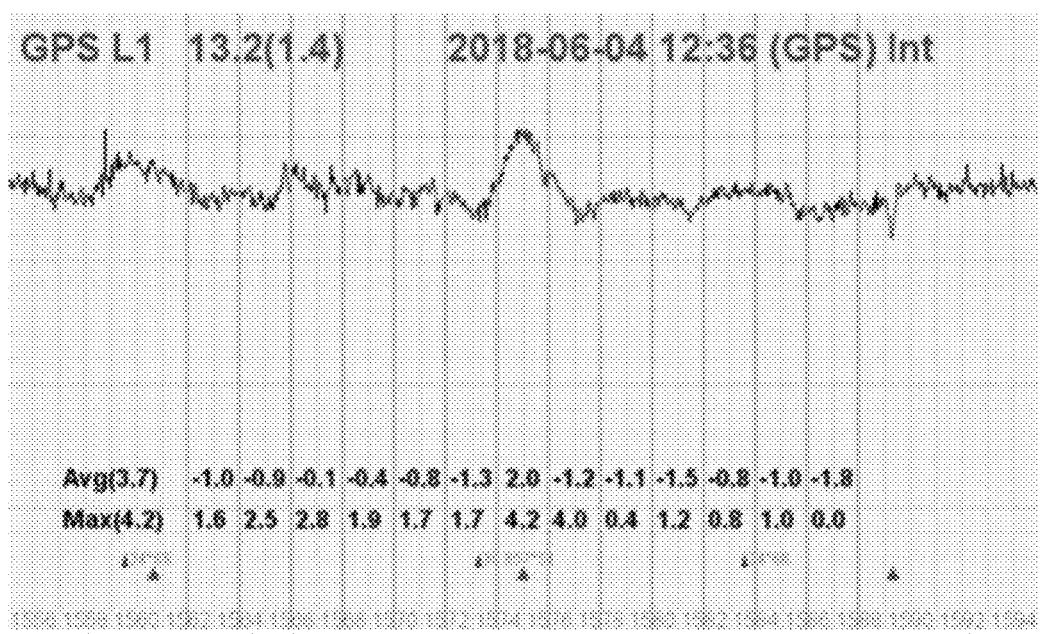
FIG. 3E illustrates an example user interface showing a spectrum of a received signal that is a spoofing signal, in accordance with various embodiments of the present invention.

Further, as shown at FIG. 3E, another example user interface provided by the GNSS device is illustrated providing further details of a tracked signal. This user interface shows a spectrum of a received signal (e.g., a GPS L1 signal) in a graph where the x-axis is frequency and y-axis is signal power. As discussed above regarding at least FIG. 3D, there is no indication on the spectrum shape and level that the tracked signal is a spoofing signal.

In the foregoing examples at FIGS. 3B-3E, while there are no indications of spoofing at the noise level and the spectrum shape/level, the systems and methods described herein can detect spoofing signals by tracking each signal's peaks. When a tracked signal has more than one correlation peak, for example as described further below at FIG. 4, the tracked signal is determined to include a spoofing signal. In some examples, systems and methods described herein also detect spoofing signals by monitoring the noise and/or power levels. For instance, when a tracked signal has an unusually high noise and/or power level, the tracked signal is determined to include a spoofing signal. Such spoofing signals may be generated when a spoofer's method includes covering a real satellite signal and adding a false signal on top of the real satellite signal to produce only a single peak, which also introduces an increase in noise level by over than 200%.

Figure 4:
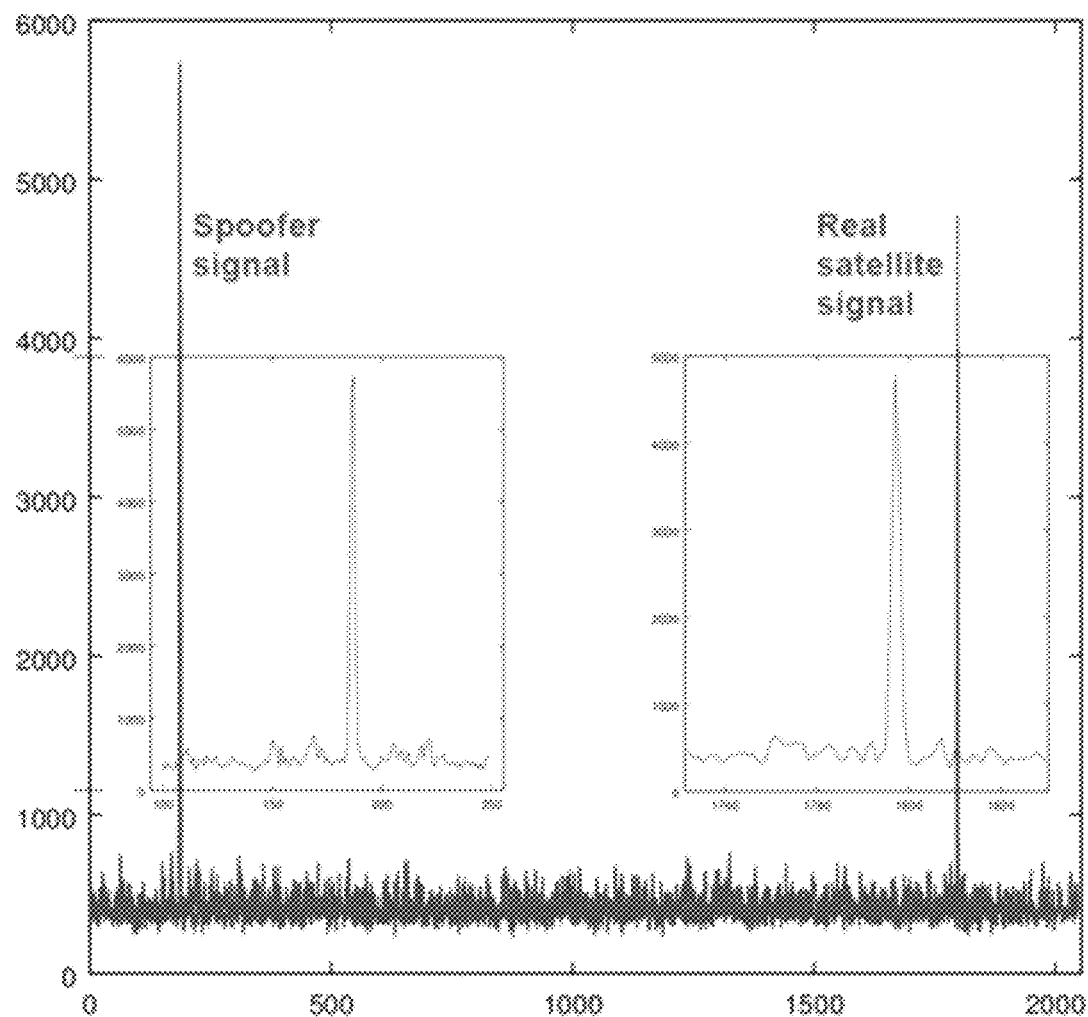
FIG. 4 illustrates an example graph where a second spoofer correlation peak is detected, in accordance with various embodiments of the present invention.

Turning to FIG. 4, in some examples as discussed above, spoofing signals are detected by tracking the peaks in each signal, such that when the GNSS device detects more than one reasonable and consistent correlation peak for any PRN code, the GNSS device determines that a spoofer exists and identifies the spoofer signal(s). For instance, FIG. 4 shows a graph where x-axis is a code chip distance and y-axis is power. The graph illustrates that in the same frequency, but at different positions or code chip distances, a spoofer signal is detected. The spoofer signal has a peak at a different code chip distance than the peak corresponding to the real satellite signal. In some cases, the peak corresponding to the spoofer signal is identified based on known positions of other signals. In some examples, code chip distance indicates how far the code needs to be shifted to match a location of the GNSS device that is determined based on other signals. Such code chip distances may indicate which peaks are genuine and/or spoofer peaks. In some examples, the GNSS device determines that there are two peaks for a PRN code (e.g., a satellite's unique pseudorandom noise code), and isolates and/or ignores the wrong peak (e.g., spoofer signal peak).

The spoofing detection and rejection described herein can be implemented on OEM GNSS boards at GNSS devices. Merely by way of example, the TRE-Quattro OEM board provided by Javad GNSS, Inc., has a total of 864 channels, all-in-view on 2 antennas, GPS L1/L2/L2C/L5, Galileo E1/E5A, E5B/AltBoc, GLONASS L1/L2/L3, BeiDou B1/B2, QZSS L1/L2/L5, KFK WASS/EGNOS (SBAS), advanced multipath reduction, fast acquisition channels, high accuracy velocity measurement, and in some cases almost unlimited altitude and velocity. In some examples, the board accepts inputs from up to four antennas, which is equivalent to four receivers that operate synchronously with a common oscillator and central processor to coordinate all communications and other activities. In some examples, the main receiver can perform long baseline RTK in conjunction with a base. The other three receivers along with the main one can provide very fast and reliable orientation (attitude) solutions. The on-board power supply on TRE-QUATTRO board can accept voltages from +6 to +40 volts and deliver clean filtered voltage where needed. This eliminates the risk of power contamination (ripples) that could be created when clean power is generated elsewhere and delivered to the board via cables. The example TRE-QUATTRO board also includes drivers for four LEDs, ON/OFF and function button controllers. In addition, the board includes a large amount of flash for data storage. The CAN interface in TRE-QUATTRO board is provided complete with all associated hardware and firmware. It is noted that other boards and GNSS devices can be contemplated. In some cases, for example for areas where heavy spoofing is known to exist, utilizing a GNSS device having OEM boards that provide more satellite systems and more signals is recommended, rather than, for example, GNSS devices utilizing a simple GPS C/A code.

Figure 5A:
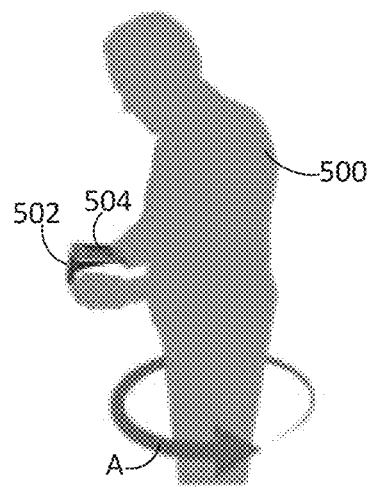
FIG. 5A illustrates an example of a user operating a GNSS device to determine a direction of a spoofer, in accordance with various embodiments of the present invention.
Figure 5B:
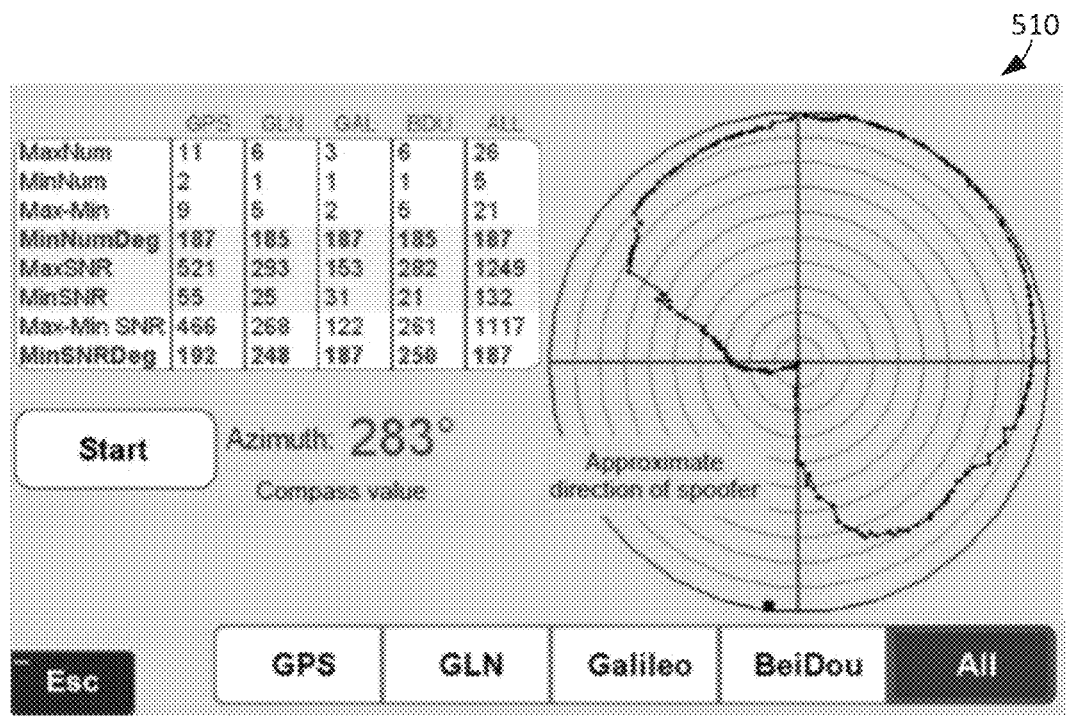
FIG. 5B illustrates an example user interface showing a determined direction of the spoofer, in accordance with various embodiments of the present invention.

Turning now to FIGS. 5A-5B, in some examples, when the GNSS device detects that spoofers exist, the GNSS device provides an option to find a direction that the spoofing signals are coming from. For example, as shown at FIG. 5A, a user 500 holding a GNSS device 502 (e.g. TRIUMPH-LS) can hold the receiver and antenna horizontally while rotating slowly in direction A (e.g., one rotation per 30 seconds) such that the device 502 finds the direction that the satellite energies become minimum. A display screen 504 at the GNSS device 502 can display a user interface (e.g., user interface 502 at FIG. 5B) that shows a determined orientation in which the spoofer is behind a null point of the antenna reception pattern. For instance, at FIG. 5B, after one or more full rotations, the GNSS device displays a user interface 510 including a graph showing the approximate orientation of the spoofer. It is noted that in some examples, for example if all signals of all satellites are determined to be spoofed, the GNSS device (e.g., device 502) warns the user to ignore the GNSS signals and to use other sensors (e.g., compass, gyroscope, altimeter) to navigate out of the spoofed area. Further, in some examples, the GNSS device can prompt the user to enter their approximate position, which can be used by the GNSS device to quickly understand if spoofers exist and then identify them.

Figure 6:
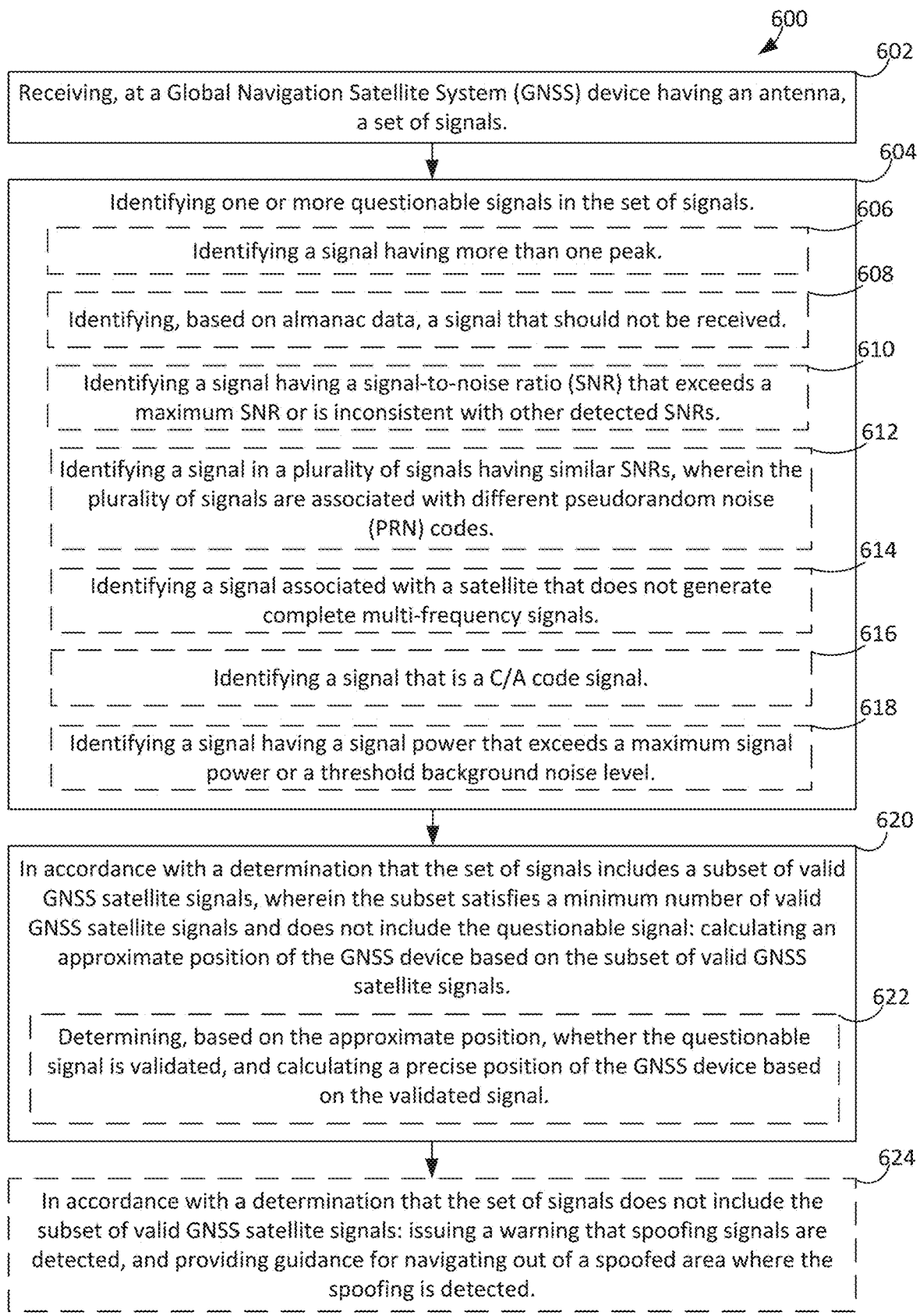
FIG. 6 illustrates an example process for detecting and rejecting spoofed signals, in accordance with various embodiments of the present invention.

FIG. 6 illustrates an example process 600 for performing spoofing detection and rejection. In some examples, process 600 is performed by a GNSS device having a GNSS antenna, receiver and computing system similar or identical to GNSS antenna 101, receiver 100 and computing system 150 of FIG. 1, and/or computing system 200 of FIG. 2.

Process 600 includes, at block 602, receiving, at a GNSS device having an antenna, a set of signals. Merely by way of example, the set of signals can be received in response to a user request at the GNSS device, periodically in accordance with predetermined timing, continuously during a mission and/or while the GNSS device is on, in response to a condition detected or determined at the GNSS device, and/or in response to a request from an external application or device in connection with the GNSS device.

In some examples, the GNSS device includes a plurality of channels for receiving a plurality of signals from a plurality of satellites. In such cases, process 600 can include assigning more than one channel to each satellite such that all signals transmitted from each satellite are received and/or otherwise tracked by the GNSS device. For example, process 600 can include, for each satellite of the plurality of satellites, assigning multiple channels to the satellite using at least a PRN code associated with the satellite, and receiving, at the multiple channels, the set of signals (e.g., GNSS signals), whereby each signal of the set of signals includes a PRN code associated with its source satellite and is received at its assigned channel at the GNSS device. Merely by way of example, the GNSS device, and/or more specifically its receiver, includes 864 tracking channels and over 130,000 fast acquisition channels at its chip (e.g., TRIUMPH2® Chip). In some examples, the chip (e.g., TRIUMPH® Chip) includes 216 channels for tracking GNSS signals and is accompanied by 110,000 regular correlators.

Process 600 includes, at block 604, identifying a questionable signal (e.g., potential spoofing signal) in the set of signals. In some examples, one or more signals are identified as questionable signals by employing digital signal processing. Signals identified as questionable signals can be flagged and/or included in a group of questionable signals (e.g., the group of questionable signals being a subset of the set of signals received at the GNSS device) for subsequent analysis or validation.

In some examples, at block 606, identifying the questionable signal includes identifying a signal having more than one peak. For instance, process 600 can include tracking and correlating peaks of each received signal and identifying, for a received signal, whether a second peak exists. If at least two reasonable peaks are detected (e.g., insignificant peaks are ignored), then one of the peaks is determined to be a spoofer correlation peak and/or the signal is determined to be a spoofing, or otherwise questionable, signal. Merely by example, the GNSS device includes 864 tracking channels and over 130,000 fast acquisition channels at its chip (e.g., TRIUMPH2® Chip). In some examples, the chip (e.g., TRIUMPH® Chip) includes 216 channels for tracking GNSS signals accompanied by 110,000 regular correlators. As discussed above, process 600 may include assigning more than one channel to each satellite signal and tracking all peaks of each satellite signal, including real peaks and spoofer peaks. Process 600 may exclude any signals having more than one correlation peak (e.g., at least for purposes in determining the initial or approximate position). A benefit of ignoring signals with multiple correlation peaks is that use of wrong ranging information (e.g., information corresponding to the spoofer correlation peak) for determining location and/or time can be prevented, thereby reducing the risk of determining wrong position and/or time solutions by the GNSS device. It is noted, however, that in some cases, although a received signal is determined to have only one reasonable peak, the received signal may be determined to be a spoofing or otherwise questionable signal when the signal is determined to originate from an unknown or otherwise invalid satellite, as discussed further below.

In some examples, at block 608, identifying the questionable signal includes identifying, based on external data such as almanac data, a signal that should not be received by the GNSS device. For instance, in some examples, process 600 determines that a signal that should not be visible, detected, or otherwise exist has been received and subsequently designates the signal as a questionable signal. Merely by way of example, such questionable signals indicate that a spoofer (e.g., spoofing signal broadcasting system or radio) has broadcasted a spoofing signal for a satellite that is below the horizon in the spoofed area or for a satellite that does not exist. It is noted that in such cases, only one correlation peak may exist for the spoofing signal. In some examples, process 600 includes downloading or otherwise accessing certified and valid almanac data from an external data source, and based on the almanac data, determining whether a received signal is a questionable signal (e.g., should not be visible, detected, or otherwise exist). Such almanac data may include information about visibility, time, and/or status of satellites for a certain window of time, and expire or become no longer valid after a predetermined period of time (e.g. several weeks). In some examples, almanac data is acquired prior to a mission that utilizes the GNSS device. In some cases, the GNSS device acquires additional external data from various outside sources and utilizes such additional external data with the almanac data in determining whether signals is questionable. Further, in some examples, the GNSS device automatically acquires the external data periodically or when it detects that network connection to the external data source is available. In some examples, the GNSS device acquires such data based on or in response to a user request input at the device.

In some examples, at block 610, identifying the questionable signal includes identifying a signal having a signal-to-noise ratio (SNR) that exceeds a maximum SNR or is inconsistent with other detected SNRs. For example, a received signal having an unreasonably high SNR indicates that there may be a spoofing signal covering an actual GNSS signal of a visible satellite. The spoofing signal may cover the actual GNSS signal with noise, which may be detected when a maximum SNR is exceeded by the received signal.

In some examples, at block 612, identifying the questionable signal includes identifying a signal belonging to plurality of signals having similar SNRs, wherein the plurality of signals are associated with different pseudorandom noise (PRN) codes. In some examples, the plurality of signals is determined to be a plurality of questionable signals.

In some examples, at block 614, identifying the questionable signal includes identifying a signal associated with a satellite that does not generate complete multi-frequency signals. Merely by way of example, the satellite may have a different PRN code than expected and/or otherwise indicate a spoofed or false satellite. For instance, in some cases, spoofers generate only C/A code signals.

In some examples, at block 616, identifying the questionable signal includes identifying a signal that is a C/A code signal. For example, process 600 includes initially ignoring C/A signals, and/or any classification or type of signal that is commonly generated by spoofer systems, when calculating the initial approximate position.

In some examples, at block 618, identifying the questionable signal includes identifying a signal having a signal power that exceeds a maximum signal power, such as an unreasonably high power level. In some examples, identifying the questionable signal includes identifying a signal having a noise level that exceeds a threshold background noise level, such as a threshold low or high background noise level. Merely by way of example, exceeding a maximum signal power and/or maximum background noise level may occur when a spoofing signal is covering an actual GNSS signal with added noise and/or power. Further, in some examples, a signal power that is too low (e.g., below a minimum power level) and/or below a threshold low background noise level indicates an odd signal that is inconsistent or unexpected.

Still further, in some examples, a user can change or define characteristics or certain types of signals to be flagged as questionable signals. In some cases, such user definitions can be generally applied at the GNSS device, or associated with a specific mission, location, time and date, user profile, battery or power level, and so on. Such user definitions can be received at the GNSS device via a user input device and/or a computing system in operative communication with the device.

Process 600 includes, at block 620, in accordance with a determination that the set of signals includes a subset of valid GNSS satellite signals, wherein the subset satisfies a minimum number of valid GNSS satellite signals and does not include the questionable signal, calculating an approximate position of the GNSS device based on the subset of valid GNSS satellite signals. For instance, in some examples, process 600 includes ignoring or otherwise removing any identified questionable signals from the set of signals and computing the initial approximate position using valid signals only. The computed approximate position may include an approximate latitude, longitude, altitude, speed, accuracy, and/or time at the GNSS device.

In some examples, process 600 includes determining whether the set of signals includes at least the minimum number of valid GNSS satellite signals. Computing the initial approximate position may be based on all valid signals and/or some valid signals in the set of signals. In some cases, the valid signals are ranked (e.g., based on incoming time, strongest signals to weakest signals, type of signal or satellite), and the approximate position is determined based on the highest ranked valid signals. In some examples, a user can specify how many signals are used to calculate the approximate position, which signals, satellites, and/or other factors are used for calculating the approximate position. In some examples, a battery power level of the GNSS device and/or signal strengths of the signals determines, at least in part, which valid signals are utilized in calculating approximate positions.

In some examples, the minimum number of valid GNSS satellite signals is four valid signals. The minimum number of valid GNSS satellite signals can correspond to a minimum number of signals needed to compute an approximate position. In some examples, the minimum number of signals varies based on which combination of satellite signals is being used for navigation and/or which calculation is being determined (e.g., address, city, latitude, longitude, altitude, speed, accuracy, and/or time). In some examples, each signal that is determined to be a valid signal has only one reasonable or otherwise expected peak, which may be determined using digital signal processing. In some cases, valid GNSS signals (e.g., the subset of valid GNSS signals received) comprise signals received from one or more valid navigation systems known by the GNSS device, such as GPS (e.g., L1, L2, L2P, L2C, L5), Galileo (e.g., E1, E5A, E5B, AltBoc), GLONASS (e.g., L1, L2, L3), BeiDou (e.g., B1, B2), QZSS (e.g., L1, L2, L5), SBAS, IRNSS, WASS/EGNOS (SBAS) navigation systems.

In some examples, process 600 includes, at block 622, based on the approximate position, determining whether the questionable signal is validated, and calculating a precise position of the GNSS device based on the validated signal. For example, the GNSS device described herein validates each identified questionable signal by checking whether the questionable signal matches a known position, such as the approximate position that was calculated based on valid signals and/or a manually-entered known position. Questionable signals that match the known position are validated, while questionable signals that do not match the known position are invalidated or otherwise regarded as non-validated or spoofing signals, which may be discarded. In some cases, in accordance with a determination that one or more questionable signals is validated, process 600 includes calculating a new or more precise position, such as recalculating the approximate position, based on both the valid signals and the validated signals to determine a more precise position. The computed precise position may include precise latitude, longitude, altitude, speed, accuracy, and/or time at the GNSS device.

In some examples, in accordance with a determination that no questionable signal is validated, process 600 includes designating or otherwise referencing the initially calculated approximate position as the precise position or true position. In some cases, GNSS device indicates (e.g., via a display screen) that one or more spoofing signals is detected, and displays both the approximate position and the precise or true position.

In some examples, process 600 includes, at block 624, in accordance with a determination that the set of signals does not include the subset of valid GNSS satellite signals: issuing a warning that spoofer signals are detected, and/or providing guidance for navigating out of a spoofed area where the spoofer is detected. In some examples, the set of signals does not include the subset of valid GNSS satellite signals when all received signals are determined to be spoofing or otherwise questionable signals, and/or when there are not enough valid signals to satisfy the minimum number of valid GNSS signals to provide an approximate position. In some cases, the GNSS device issues a warning (e.g., visible, audible, and/or haptic) to ignore the set of GNSS signals (e.g., when all signals of all satellites are determined to be spoofed) and/or to use other sensors in the integrated GNSS system for navigation. In some cases, the GNSS device alters a mode of operation. For example, in some cases, the GNSS device automatically activates the other sensors (e.g., compass, gyroscope, altimeter) and employs data collected from the other sensors to provide guidance for navigating the user of the GNSS device out of the spoofed area. In some cases, such warnings are reported to other external systems in communication with the GNSS device. Further, in some examples, the GNSS device alters a mode of operation from providing navigation based on satellite signals to determining a source or direction of the received spoofing signal, and/or providing navigation based on the other sensors.

In some examples, process 600 includes determining a direction of a source of the questionable signal by detecting a direction in which a GNSS satellite signal energy reaches a minimum level. In some cases, the set of signals is received at the GNSS device via the antenna while the antenna is at a first orientation, a second set of signals is received via the antenna while the antenna is at a second orientation different from the first orientation, and the direction of the source of the questionable signal (and/or the source of multiple questionable signals) is determined based on the set of signals and the second set of signals. Merely by way of example, the GNSS device may instruct the user (e.g., via display screen or audible output) to hold the device (e.g. TRIUMPH-LS®), receiver and/or antenna horizontally while rotating it slowly (e.g., one rotation about 30 seconds, and/or as shown in FIG. 5A). While rotating, the GNSS device may capture a plurality of satellite signals received at a plurality of orientations during the rotation, and based on the received signals, determine and display the direction that the satellite energies reach a minimum. The determined direction can indicate an orientation or direction in which the spoofer system is behind a null point of a detected antenna reception pattern (see, e.g., FIG. 5B).

In some examples, process 600 includes receiving, at a user input device (e.g., touchscreen, keypad, keyboard) associated with the GNSS device, a manually-entered approximate position (e.g., address, city, latitude, longitude, altitude, speed, accuracy, and/or time), and based on the manually-entered approximate position, determining whether the set of signals includes a spoofing or otherwise questionable signal. For example, in some difficult situations, the user may wish to enter their approximate position to quickly determine if spoofers exist, and then identify them and/or determine a direction of their source. In some examples, the GNSS device determines a precise location (e.g., a precise address, city, latitude, longitude, altitude, speed, accuracy, and/or time) based on the manually-entered approximate position and the received GNSS satellite signals.

Variations of the systems and methods described herein can be contemplated. For instance, in some cases, the GNSS device generates an alert (e.g., a real-time alert) once a signal that is identified as a spoofing signal or questionable signal has been received. For instance, upon receiving a set of signals (e.g., GNSS satellite signals), the GNSS device can determine whether the set of signals includes a spoofing or otherwise questionable signal. Such spoofing or generally questionable signals are identified by the GNSS device in accordance with any of the techniques described herein, such as by signal processing and/or comparing characteristics of the signal against a database, such as a database of almanac data. As discussed in examples above, a signal is identified as a spoofing or questionable signal when the signal contains more than one correlation peak (e.g., contains a spoofer correlation peak), the signal should not exist based on almanac data (e.g., if the signal is associated with a source satellite that should not be detected based on almanac data), the signal exceeds a predetermined signal-to-noise ratio (e.g., a maximum SNR ratio), the signal exceeds a predetermined signal power (e.g., a maximum signal power), the signal exceeds a predetermined noise level (e.g., a threshold noise level), the signal is not a complete multi-frequency signal (e.g., the signal is a C/A code signal), and/or the signal includes any combination of these attributes or other attributes discussed herein.

Upon determining that the spoofing or otherwise questionable signal has been received, the GNSS device can output an indication that the false signal exists. For example, the GNSS device outputs a visual indication on its display screen, such as a user interface indicating that the spoofing or questionable signal has been received. In some cases, the user interface includes details on the received signal, such as a timestamp when it was detected, type or characteristic(s) of the spoofing or questionable signal, and/or options for the user to select whether to change an operational mode of the device (e.g., other navigation or sensor mode, activate a mode for determining a direction of the spoofer). In some cases, the GNSS device outputs an audible indication and/or a haptic indication when the spoofing or questionable signal has been identified. For example, the GNSS device generates a warning sound for output at a speaker at the device, or generates a vibration pattern for output through a haptic output generator at the device. Still, in some examples, the GNSS device generates an alert or message (e.g., text message) that is transmitted to an external user device, such as to user's smart phone, which may display or otherwise output an indication that a spoofing or questionable signal has been detected at the GNSS device. In some cases, upon determining that the set of signals does not include any spoofing or questionable signals, the GNSS device forgoes generating such indications and/or proceeds with normal operation (e.g., calculates a position and/or time based on the set of signals). It is noted that in any of the foregoing examples, the GNSS device may store information related to spoofing or questionable signals received at the device in a database or log.

It is contemplated that the spoofing detection and rejection method described herein, including the identification of questionable signals, the determination of approximate and precise locations, and the determination of the direction of spoofing signal origination, are determined at the GNSS device in real-time while signals are received and measured at the GNSS device. It is noted that post-processing techniques are also allowed. For example, received signals and/or results from signal processing analysis can be stored at the GNSS device (e.g., at memory 140, memory 208, any of storage devices 210) and used for both real-time and post-processing.

It will be appreciated that, for clarity purposes, the above description has described examples with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone. Further, use of terms such as first, second, third, etc., do not necessarily denote any ordering or importance, but rather are used to distinguish one element from another.

What is claimed is:

1. A method for detecting and rejecting spoofing signals, comprising:
   receiving, at a Global Navigation Satellite System (GNSS) device having an antenna, a set of signals;
   identifying a questionable signal in the set of signals, wherein identifying the questionable signal includes identifying a signal having more than one power peak; and
   in accordance with a determination that the set of signals includes a subset of valid GNSS satellite signals, wherein the subset satisfies a minimum number of valid GNSS satellite signals and does not include the questionable signal, calculating an approximate position of the GNSS device based on the subset of valid GNSS satellite signals.

2. The method of claim 1, further comprising:
   determining, based on the approximate position, that the questionable signal is validated, and
   calculating a precise position of the GNSS device based on the validated signal.

3. The method of claim 1, further wherein the minimum number of valid GNSS satellite signals is four valid GNSS satellite signals.

4. The method of claim 1, further comprising:
   in accordance with a determination that the set of signals does not include the subset of valid GNSS satellite signals:
      issuing a warning that spoofing signals are detected; and
      providing guidance for navigating out of a spoofed area where the spoofing is detected.

5. The method of claim 1, further wherein identifying the questionable signal includes identifying, based on almanac data, a signal that should not be received by the GNSS device.

6. The method of claim 1, further wherein identifying the questionable signal includes identifying a signal having a signal-to-noise ratio (SNR) that exceeds a maximum SNR or is inconsistent with other detected SNRs.

7. The method of claim 1, further wherein identifying the questionable signal includes identifying a signal in a plurality of signals that have similar SNRs, wherein the plurality of signals are associated with different pseudorandom noise (PRN) codes.

8. The method of claim 1, further wherein identifying the questionable signal includes identifying a signal associated with a satellite that does not generate complete multi-frequency signals.

9. The method of claim 1, further wherein identifying the questionable signal includes identifying a signal that is a C/A code signal.

10. The method of claim 1, further wherein identifying the questionable signal includes identifying a signal having a signal power that exceeds a maximum signal power or a threshold background noise level.

11. The method of claim 1, further wherein the GNSS device includes a plurality of channels for receiving a plurality of signals from a plurality of satellites, the method further comprising:
   for each satellite of the plurality of satellites, assigning multiple channels from the plurality of channels to the satellite using a PRN code associated with the satellite; and
   receiving, at the plurality of channels, the set of signals, wherein each signal of the set of signals includes the PRN code associated with its source satellite.

12. The method of claim 1, further wherein the subset of valid GNSS satellite signals comprises signals received from at least one of a GPS, Galileo, GLONASS, BeiDou, QZSS, SBAS, and IRNSS navigation systems.

13. A non-transitory computer readable storage medium storing one or more programs, the one or more programs comprising instructions, which when executed by a GNSS device having an antenna, cause the device to perform the method of claim 1.

14. A GNSS device, comprising:
   an antenna;
   one or more processors;
   memory; and
   one or more programs, wherein the one or more programs are stored in the memory and configured to be executed by the one or more processors, the one or more programs including instructions for performing the method of claim 1.

15. A GNSS device, comprising:
   means for performing the method of claim 1.

16. A method for detecting and rejecting spoofing signals, comprising:
   receiving, at a Global Navigation Satellite System (GNSS) device having an antenna, a set of signals;
   identifying a questionable signal in the set of signals;
   in accordance with a determination that the set of signals includes a subset of valid GNSS satellite signals, wherein the subset satisfies a minimum number of valid GNSS satellite signals and does not include the questionable signal,
   calculating an approximate position of the GNSS device based on the subset of valid GNSS satellite signals; and
   determining a direction of a source of the questionable signal by detecting a direction in which a GNSS satellite signal energy reaches a minimum level.

17. The method of claim 16, further wherein the set of signals is received at the GNSS device via the antenna while the antenna is at a first orientation, the method further comprising:
   receiving a second set of signals at the GNSS device via the antenna while the antenna is at a second orientation different from the first orientation; and
   determining the direction of the source of the questionable signal based on the set of signals and the second set of signals.

18. A method for detecting and rejecting spoofing signals, comprising:
- receiving, at a Global Navigation Satellite System (GNSS) device having an antenna, a set of signals;
- identifying a questionable signal in the set of signals;
- in accordance with a determination that the set of signals includes a subset of valid GNSS satellite signals, wherein the subset satisfies a minimum number of valid GNSS satellite signals and does not include the questionable signal,
- calculating an approximate position of the GNSS device based on the subset of valid GNSS satellite signals;
- receiving, at a user input device associated with the GNSS device, a manually-entered approximate position; and
- based on the manually-entered approximate position, determining whether the set of signals includes a spoofing signal.

\* \* \* \* \*